(12) United States Patent
Tanaka

(10) Patent No.: US 11,230,046 B2
(45) Date of Patent: Jan. 25, 2022

(54) EXTRUDER, MASTERBATCH MANUFACTURING METHOD, AND TIRE MANUFACTURING METHOD

(71) Applicant: TOYO TIRE CORPORATION, Itami (JP)

(72) Inventor: Makoto Tanaka, Itami (JP)

(73) Assignee: TOYO TIRE CORPORATION, Itami (JP)

(*) Notice: Subject to any disclaimer, the term of this patent is extended or adjusted under 35 U.S.C. 154(b) by 337 days.

(21) Appl. No.: 16/346,241

(22) PCT Filed: Jul. 18, 2017

(86) PCT No.: PCT/JP2017/025907
§ 371 (c)(1),
(2) Date: Apr. 30, 2019

(87) PCT Pub. No.: WO2018/131193
PCT Pub. Date: Jul. 19, 2018

(65) Prior Publication Data
US 2019/0270234 A1  Sep. 5, 2019

(30) Foreign Application Priority Data

Jan. 10, 2017 (JP) ................................ JP2017-001588

(51) Int. Cl.
| | | |
|---|---|---|
| *B29B 7/90* | (2006.01) | |
| *B29C 48/53* | (2019.01) | |
| *B29C 48/395* | (2019.01) | |
| *B29B 7/42* | (2006.01) | |
| *B29D 30/06* | (2006.01) | |
| *C08C 1/14* | (2006.01) | |
| *C08J 3/22* | (2006.01) | |
| *B29D 30/00* | (2006.01) | |
| *B29B 7/84* | (2006.01) | |
| *B29B 7/74* | (2006.01) | |
| *C08K 3/04* | (2006.01) | |

(52) U.S. Cl.
CPC .............. *B29C 48/53* (2019.02); *B29B 7/42* (2013.01); *B29B 7/429* (2013.01); *B29B 7/7495* (2013.01); *B29B 7/842* (2013.01); *B29B 7/90* (2013.01); *B29C 48/395* (2019.02); *B29C 48/397* (2019.02); *B29D 30/00* (2013.01); *B29D 30/06* (2013.01); *C08C 1/14* (2013.01); *C08J 3/22* (2013.01); *C08J 2307/02* (2013.01); *C08K 3/04* (2013.01)

(58) Field of Classification Search
CPC ..... B29C 48/53; B29C 48/395; B29C 48/397; B29C 2948/92704; B29C 2948/92895; B29C 48/92; B29C 48/761; B29K 2007/00; B29K 2105/0032; B29K 2105/064; B29B 7/90; B29B 7/842; B29B 7/429; B29B 7/7495; B29B 7/42; C08C 1/14; C08J 3/22; C08J 2307/02; C08K 3/04

USPC ........................................................ 264/211
See application file for complete search history.

(56) References Cited

U.S. PATENT DOCUMENTS

| | | | |
|---|---|---|---|
| 4,767,025 A | | 8/1988 | Gebauer et al. |
| 5,127,741 A | * | 7/1992 | Capelle .................. B29C 48/56 366/80 |
| 5,698,235 A | * | 12/1997 | Satoh .................... B29C 48/535 425/208 |
| 2012/0065325 A1 | | 3/2012 | Nakayama |
| 2015/0247011 A1 | | 9/2015 | Nomura et al. |
| 2017/0152353 A1 | | 6/2017 | Nishimura |

FOREIGN PATENT DOCUMENTS

| | | | |
|---|---|---|---|
| JP | 62-1446 A | 1/1987 | |
| JP | 62-132529 A | 6/1987 | |
| JP | 11-138530 A | 5/1999 | |
| JP | 2001-353719 A | 12/2001 | |
| JP | 2002-537144 A | 11/2002 | |
| JP | 2007-301776 A | 11/2007 | |
| JP | 4505038 B1 | 7/2010 | |
| JP | 4527800 B1 | 8/2010 | |
| JP | 2011-32424 A | 2/2011 | |
| JP | 2016-94501 A | 5/2016 | |
| JP | 2016-141720 A | 8/2016 | |
| WO | 00/048817 A1 | 8/2000 | |
| WO | 2010/123072 A1 | 10/2010 | |
| WO | 2014/073234 A1 | 5/2014 | |
| WO | 2015/194197 A1 | 12/2015 | |
| WO | 2017/085972 A1 | 5/2017 | |

OTHER PUBLICATIONS

International Search Report dated Aug. 29, 2017, issued in counterpart application No. PCT/JP2017/025907 (2 pages).
Office Action dated Aug. 4, 2020, issued in counterpart CN Application No. 201780069744.0, with English translation.(18 pages).
Notification of Transmittal of Translation of the International Preliminary Report on Patentability (Form PCT/IB/338) dated Jul. 25, 2019, issued in counterpart International Application No. PCT/JP2017/025907 with Forms PCT/IB/373 and PCT/ISA/237. (6 pages).

(Continued)

*Primary Examiner* — Hannah J Pak
(74) *Attorney, Agent, or Firm* — Westerman, Hattori, Daniels & Adrian, LLP

(57) ABSTRACT

An extruder is disclosed including: a barrel; and a screw provided with a helical groove; wherein the screw comprises a dewatering portion comprising a first portion, and a second portion at a location downstream from the first portion; wherein, at the dewatering portion, clearance between the groove and the barrel decreases as one proceeds downstream; and wherein clearance reduction ratio at the first portion is greater than clearance reduction ratio at the second portion.

11 Claims, 2 Drawing Sheets

(56) References Cited

OTHER PUBLICATIONS

Notification of Reasons for Refusal dated Nov. 10, 2020, issued in counterpart JP Patent Application No. 2017-001588, w/English translation (8 pages).
Office Action dated Mar. 24, 2021, issued in counterpart CN Application No. 201780069744.0, with English translation. (13 pages).

* cited by examiner

[FIG. 1]
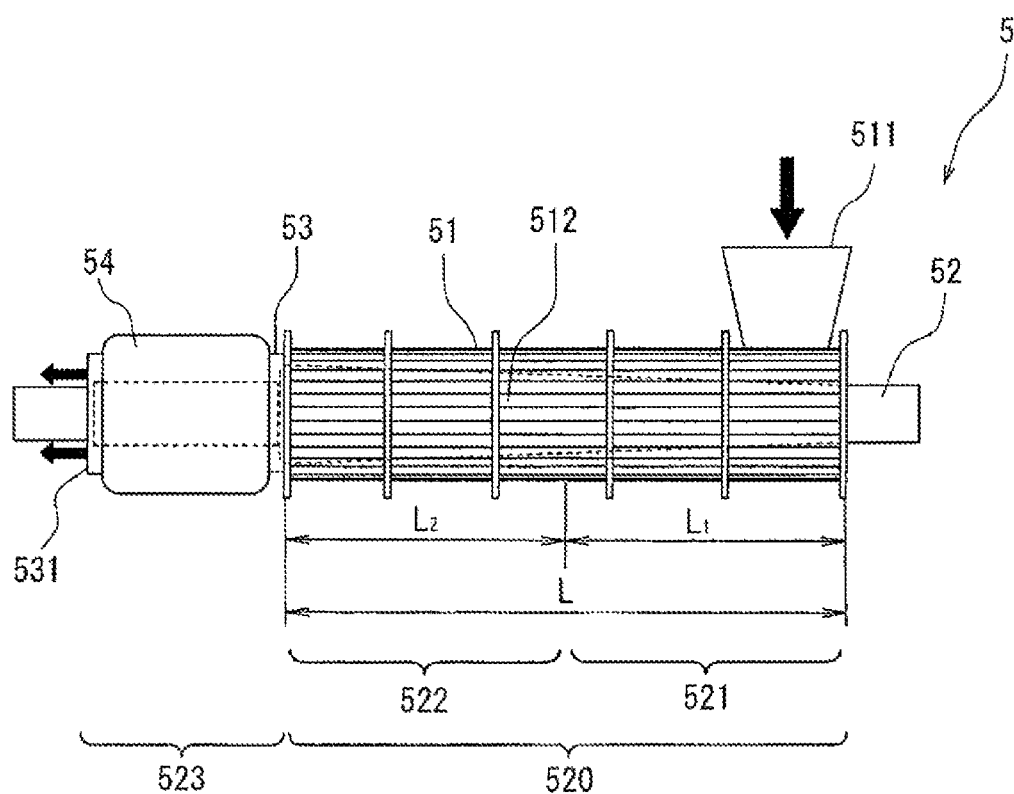

[FIG. 2]
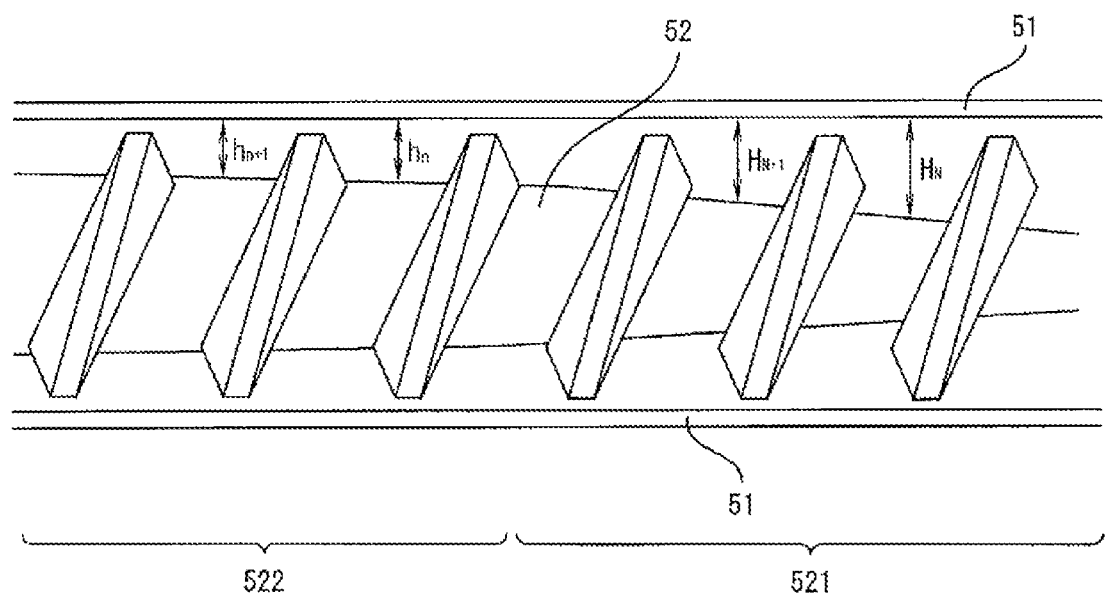

EXTRUDER, MASTERBATCH MANUFACTURING METHOD, AND TIRE MANUFACTURING METHOD

TECHNICAL FIELD

The present disclosure relates to an extruder, a masterbatch manufacturing method, and a tire manufacturing method.

BACKGROUND ART

Wet masterbatch might, for example, be manufactured using a procedure in which a carbon black slurry and natural rubber latex are mixed, this is coagulated, an extruder is used to dewater the coagulum, and plasticization is carried out as this is being dried. At the extruder, water content of the coagulum is removed not only by compaction but is also removed by evaporation.

While almost all of the water content of the coagulum is removed with this procedure, a portion of the water content remains in the wet masterbatch. For example, there is a description in Patent Reference No. 1 to the effect that water content following use of a screw press is 1.2%.

It is desirable that the water content of the coagulum be reduced efficiently. This is because water content causes occurrence of voids and can lead to reduction in the properties of the vulcanized rubber.

PRIOR ART REFERENCES

Patent References

PATENT REFERENCE NO. 1: Japanese Patent No. 4505038
PATENT REFERENCE NO. 2: Japanese Patent No. 4527800

SUMMARY OF INVENTION

Means for Solving Problem

An extruder for manufacturing masterbatch in accordance with the present disclosure comprises:
a barrel; and
a screw provided with a helical groove;
wherein the screw comprises a dewatering portion comprising a first portion, and a second portion at a location downstream from the first portion;
wherein, at the dewatering portion, clearance between the groove and the barrel decreases as one proceeds downstream; and
wherein clearance reduction ratio R at the first portion is greater than clearance reduction ratio r at the second portion.
R is given by Formula I.

$$R = H_N/H_{N+1} \qquad \text{FORMULA I}$$

At Formula I, $H_N$ indicates the clearance between the groove and the barrel at an arbitrary Nth turn of the groove in the first portion, and $H_{N+1}$ indicates the clearance between the groove and the barrel at the N+1st turn of the groove in the first portion.
r is given by Formula II.

$$r = h_n/h_{n+1} \qquad \text{FORMULA II}$$

At Formula II, $h_n$ indicates the clearance between the groove and the barrel at an arbitrary nth turn of the groove in the second portion, and $h_{n+1}$ indicates the clearance between the groove and the barrel at the n+1st turn of the groove therein.

A masterbatch manufacturing method in accordance with the present disclosure comprises an operation in which pre-coagulation rubber latex comprising filler is coagulated to obtain a coagulum; and an operation in which an extruder in accordance with the present disclosure is used to dewater the coagulum.

BRIEF DESCRIPTION OF DRAWINGS

FIG. 1 Front view of extruder used at a first embodiment.
FIG. 2 Drawing to assist in describing the interior of a barrel.

EMBODIMENTS FOR CARRYING OUT INVENTION

It is an object of the present disclosure to provide an extruder that is capable of efficiently reducing the water content of a coagulum. It is also an object of the present disclosure to provide a masterbatch manufacturing method that makes it possible to efficiently reduce the water content of a coagulum.

An extruder for manufacturing masterbatch in accordance with the present disclosure comprises:
a barrel; and
a screw provided with a helical groove;
wherein the screw comprises a dewatering portion comprising a first portion, and a second portion at a location downstream from the first portion;
wherein, at the dewatering portion, clearance between the groove and the barrel decreases as one proceeds downstream; and
wherein clearance reduction ratio R at the first portion is greater than clearance reduction ratio r at the second portion.
R is given by Formula I.

$$R = H_N/H_{N+1} \qquad \text{FORMULA I}$$

At Formula I, $H_N$ indicates the clearance between the groove and the barrel at an arbitrary Nth turn of the groove in the first portion, and $H_{N+1}$ indicates the clearance between the groove and the barrel at the N+1st turn of the groove in the first portion.
r is given by Formula II.

$$r = h_n/h_{n+1} \qquad \text{FORMULA II}$$

At Formula II, $h_n$ indicates the clearance between the groove and the barrel at an arbitrary nth turn of the groove in the second portion, and $h_{n+1}$ indicates the clearance between the groove and the barrel at the n+1st turn of the groove therein.

An extruder in accordance with the present disclosure is capable of efficiently reducing the water content of a coagulum. This is because an extruder in accordance with the present disclosure is capable of causing coagulum temperature to be increased to a temperature at which water content removal effect is high at the first portion, and is capable of limiting increase in temperature and suppressing excessive softening of the coagulum at the second portion. What is meant by "a temperature at which water content removal effect is high" is a temperature at which two effects, these being removal of water by means of evaporation and removal of water by means of compaction, operate at the coagulum. This might, for example, be 110° C. to 160° C.

A masterbatch manufacturing method in accordance with the present disclosure comprises an operation in which pre-coagulation rubber latex comprising filler is coagulated to obtain a coagulum; and an operation in which an extruder in accordance with the present disclosure is used to dewater the coagulum.

A masterbatch manufacturing method in accordance with the present disclosure is capable of efficiently reducing water content which may cause occurrence of voids, and is capable of improving the hardness and/or tear strength of vulcanized rubber.

A tire manufacturing method in accordance with the present disclosure comprises a masterbatch manufacturing method in accordance with the present disclosure.

Embodiment 1

The present disclosure will now be described in terms of a first embodiment. Description will first be given with respect to a specific example of an extruder in accordance with the present disclosure.

As shown in FIG. 1, extruder 5 is a single-screw extruder which is equipped with barrel 51, screw 52, and barrel 53. Extruder 5 is further equipped with jacket 54 which covers the side face of barrel 53. Extruder 5 dewaters a coagulum by means of compaction and evaporation within barrel 51, and causes the coagulum to be plasticized as it is dried within barrel 53.

Extruder 5 is equipped with barrel 51. Barrel 51 is provided with slit(s) 512 which extend in parallel fashion with respect to the direction of the screw axis. Slit(s) 512 may continuously and/or intermittently extend in parallel fashion with respect to the direction of the screw axis. Slit width might, for example, be 0.1 mm to 2.0 mm. Barrel 51 is provided with feed port 511.

Extruder 5 is provided with barrel 53 at a location which is downstream from barrel 51. Barrel 53 is contiguous with and downstream from barrel 51. Barrel 53 is provided with discharge port 531.

Extruder 5 is equipped with screw 52. Screw 52 is provided with helical groove(s). Extruder 5 is capable of causing a coagulum to be deformed as a result of rotation of screw 52 in the space between barrel 51 and screw 52. The interior of screw 52 is provided with flow passage(s) (not shown) for heating fluid. As heating fluid, steam may be cited as an example. Extruder 5 is capable not only of rotating screw 52 but also of heating the coagulum by means of the heating fluid.

Screw 52 comprises dewatering portion 520 which is disposed at the interior of barrel 51. As shown in FIG. 2, at dewatering portion 520, clearance between the groove and barrel 51 decreases as one proceeds downstream. Clearance between the groove and barrel 51 is measured at the center of the groove width in the direction of the screw axis. Length L of dewatering portion 520 in the direction of the screw axis might, for example, be 0.5 m to 10 m. Screw 52 further comprises portion 523 which is disposed at the interior of barrel 53.

Dewatering portion 520 of screw 52 comprises first portion 521, and second portion 522 which is contiguous with and downstream from first portion 521. Length $L_1$ of first portion 521 in the direction of the screw axis might, for example, be 0.1 m to 8 m. Length $L_2$ of second portion 522 in the direction of the screw axis might, for example, be 0.1 m to 8 m. The ratio ($L_1/L_2$) of $L_1$ to $L_2$ might, for example, be ¼ to 4. At first portion 521, the groove might, for example, make 2 turns to 15 turns. At first portion 521, the lower limit of the range in values for the number of turns of the groove may be 3 turns. At second portion 522, the groove might, for example, make 2 turns to 15 turns. At second portion 522, the lower limit of the range in values for the number of turns of the groove may be 3 turns.

As shown in FIG. 2, clearance reduction ratio R at first portion 521 is greater than clearance reduction ratio r at second portion 522. R is given by Formula I.

$$R = H_N/H_{N+1}$$  FORMULA I

At Formula I, $H_N$ indicates clearance between the groove and barrel 51 at an arbitrary Nth turn of the groove in first portion 521. $H_{N+1}$ indicates clearance between the groove and barrel 51 at the N+1st turn of the groove in first portion 521. While R may be constant or may vary, it is preferred that it be constant. Where R is constant, it is preferred that it be 1.10 to 2.60. Where R varies, it is preferred that it do so within the range 1.10 to 2.60. It is preferred that $H_N$ be within the range 1 mm to 40 mm. r is given by Formula II.

$$r = h_n/h_{n+1}$$  FORMULA II

At Formula II, $h_n$ indicates clearance between the groove and barrel 51 at an arbitrary nth turn of the groove in second portion 522. $h_{n+1}$ indicates clearance between the groove and barrel 51 at the n+1st turn of the groove therein. While r may be constant or may vary, it is preferred that it be constant. Where r is constant, it is preferred that it be 1.01 to 2.00. Where r varies, it is preferred that it do so within the range 1.01 to 2.00. It is preferred that $h_n$ be within the range 0.25 mm to 30 mm. Where both R and r are constant, it is preferred that R/r be 1.10 to 2.50.

Description will now be given with respect to specific examples of methods of manufacturing masterbatch and methods of manufacturing tires in accordance with the present disclosure. At the first embodiment, carbon black is employed as filler.

A masterbatch manufacturing method in accordance with a first embodiment comprises an operation in which carbon black and rubber latex are mixed to obtain a carbon black slurry. Mixing the carbon black and the rubber latex makes it is possible to prevent reflocculation of carbon black. This is thought to be due to formation of an extremely thin latex phase on all or part of the surface of the carbon black, the latex phase inhibiting reflocculation of carbon black. As examples of the carbon black, besides SAF, ISAF, HAF, FEF, GPF, and other such carbon blacks ordinarily used in the rubber industry, acetylene black, Ketchen black, and/or other such electrically conductive carbon blacks may be used. The carbon black may be nongranulated carbon black or may be granulated carbon black that has been granulated based upon considerations related to the handling characteristics thereof as is ordinary practice in the rubber industry. The rubber latex at the operation in which the carbon black slurry is made may for example be natural rubber latex, synthetic rubber latex, and/or the like. The number average molecular weight of natural rubber within the natural rubber latex might, for example, be not less than 2,000,000. The synthetic rubber latex might, for example, be styrene-butadiene rubber latex, butadiene rubber latex, nitrile rubber latex, and/or chloroprene rubber latex. It is preferred that solids (rubber) concentration in the rubber latex be not less than 0.1 mass %, more preferred that this be not less than 0.2 mass %, and still more preferred that this be not less than 0.3 mass %. The upper limit of the range in values for the solids concentration might, for example, be 5 mass %, it being preferred that this be 2 mass %, and it being more preferred that this be 1 mass %. The carbon black and the rubber latex may be mixed using a high-shear mixer, high shear mixer, homomixer, ball mill, bead mill, high-pressure homogenizer, ultrasonic homogenizer, colloid mill, and/or other such ordinary disperser.

In the carbon black slurry, carbon black is dispersed in water. It is preferred that the amount of carbon black in the carbon black slurry be not less than 1 mass %, and more preferred that this be not less than 3 mass %, per 100 mass % of the carbon black slurry. It is preferred that the upper limit of the range in values for the amount of carbon black in the carbon black slurry be 15 mass %, and more preferred that this be 10 mass %.

A masterbatch manufacturing method in accordance with the first embodiment further comprises an operation in which the carbon black slurry and rubber latex are mixed to obtain pre-coagulation rubber latex. The rubber latex for mixture with the carbon black slurry may for example be natural rubber latex, synthetic rubber latex, and/or the like. It is preferred that the solids concentration of the rubber latex for mixture with the carbon black slurry be greater than the solids concentration of the rubber latex at the operation in which the carbon black slurry is made. It is preferred that the solids concentration of the rubber latex for mixture with the carbon black slurry be not less than 10 mass %, and more preferred that this be not less than 20 mass %. The upper limit of the range in values for the solids concentration at the rubber latex might, for example, be 60 mass %, it being preferred that this be 40 mass %, and it being more preferred that this be 30 mass %. The carbon black slurry and the rubber latex may be mixed using a high-shear mixer, high shear mixer, homomixer, ball mill, bead mill, high-pressure homogenizer, ultrasonic homogenizer, colloid mill, and/or other such ordinary disperser. In the pre-coagulation rubber latex, rubber particles, carbon black, and so forth are dispersed in water.

A masterbatch manufacturing method in accordance with the first embodiment further comprises an operation in which the pre-coagulation rubber latex is coagulated to obtain a coagulum. Coagulant may be added to the pre-coagulation rubber latex to cause it to coagulate. The coagulant might, for example, be an acid. As the acid, formic acid, sulfuric acid, and the like may be cited as examples. The coagulum obtained by coagulation of the pre-coagulation rubber latex contains water.

A masterbatch manufacturing method in accordance with the first embodiment further comprises an operation in which the coagulum is dewatered using extruder 5. The coagulum is fed thereinto by way of feed port 511, and is dewatered by means of compaction and evaporation in the space between barrel 51 and dewatering portion 520. It is preferred that temperature of the coagulum when in the space between barrel 51 and second portion 522 be not greater than 160° C.

A masterbatch manufacturing method in accordance with the first embodiment further comprises an operation in which the dewatered coagulum is plasticized as it is dried by means of extruder 5. At extruder 5, the coagulum which has been delivered from the interior of barrel 51 to the interior of barrel 53 is plasticized as it is dried within barrel 53.

A masterbatch manufacturing method in accordance with the first embodiment further comprises an operation in which the plasticized coagulum is molded as necessary to obtain masterbatch.

The masterbatch comprises rubber. The rubber might, for example, be natural rubber, isoprene rubber, butadiene rubber, styrene-butadiene rubber, nitrile rubber, chloroprene rubber, and/or the like. It is preferred that the amount of natural rubber in the masterbatch be not less than 70 mass %, more preferred that this be not less than 80 mass %, still more preferred that this be not less than 90 mass %, and still more preferred that this be 100 mass %, per 100 mass % of the rubber.

The masterbatch further comprises carbon black. For every 100 parts by mass of the rubber, it is preferred that the amount of carbon black be not less than 10 parts by mass, more preferred that this be not less than 20 parts by mass, and still more preferred that this be not less than 30 parts by mass. For every 100 parts by mass of the rubber, it is preferred that the amount of carbon black be not greater than 80 parts by mass, and more preferred that this be not greater than 60 parts by mass.

A tire manufacturing method in accordance with the first embodiment further comprises an operation in which masterbatch and compounding ingredient(s)—and, where necessary, rubber not originating from the masterbatch—are dry-blended in a mixer to obtain a mixture. The compounding ingredient(s) might, for example, be stearic acid, wax, zinc oxide, antioxidant, and/or the like. As examples of the antioxidant, aromatic-amine-type antioxidants, amine-ketone-type antioxidants, monophenol-type antioxidants, bisphenol-type antioxidants, polyphenol-type antioxidants, dithiocarbamate-type antioxidants, thiourea-type antioxidants, and the like may be cited. As rubber not originating from the masterbatch, natural rubber, isoprene rubber, butadiene rubber, styrene-butadiene rubber, nitrile rubber, chloroprene rubber, and the like may be cited as examples. As the mixer, internal mixers, open roll mills, and the like may be cited as examples. As an internal mixer, Banbury mixers, kneaders, and the like may be cited as examples.

A tire manufacturing method in accordance with the first embodiment further comprises an operation in which a vulcanizing-type compounding ingredient is added to the mixture, and in which the vulcanizing-type compounding ingredient is kneaded into the mixture to obtain a rubber composition. As examples of the vulcanizing-type compounding ingredient, sulfur, organic peroxides, and other such vulcanizing agents, vulcanization accelerators, vulcanization accelerator activators, vulcanization retarders, and so forth may be cited. As the sulfur, powdered sulfur, precipitated sulfur, insoluble sulfur, high dispersing sulfur, and the like may be cited as examples. As examples of the vulcanization accelerators, sulfenamide-type vulcanization accelerators, thiuram-type vulcanization accelerators, thiazole-type vulcanization accelerators, thiourea-type vulcanization accelerators, guanidine-type vulcanization accelerators, dithiocarbamate-type vulcanization accelerators, and so forth may be cited.

The rubber composition comprises a rubber component. As the rubber component, natural rubber, isoprene rubber, butadiene rubber, styrene-butadiene rubber, nitrile rubber, chloroprene rubber, and the like may be cited as examples. It is preferred that the amount of natural rubber be not less than 40 mass %, and more preferred that this be not less than 50 mass %, per 100 mass % of the rubber component. The upper limit of the range in values for the amount of natural rubber might, for example, be 100 mass %.

The rubber composition further comprises carbon black. For every 100 parts by mass of the rubber component, it is preferred that the amount of carbon black be not less than 10 parts by mass, more preferred that this be not less than 20 parts by mass, and still more preferred that this be not less than 30 parts by mass. For every 100 parts by mass of the rubber component, it is preferred that the amount of carbon black be not greater than 80 parts by mass, and more preferred that this be not greater than 60 parts by mass.

The rubber composition may further comprise stearic acid, wax, zinc oxide, antioxidant, sulfur, vulcanization accelerator, and/or the like. It is preferred that the amount of the sulfur, expressed as equivalent sulfur content, be 0.5 part by mass to 5 parts by mass for every 100 parts by mass of the rubber component. It is preferred that the amount of the vulcanization accelerator be 0.1 part by mass to 5 parts by mass for every 100 parts by mass of the rubber component.

The rubber composition may be employed in tread(s), sidewall(s), chafer(s), bead filler(s), and other such tire member(s).

A tire manufacturing method in accordance with the first embodiment comprises an operation in which a green tire equipped with a tire member made up of the rubber composition is made. The tire manufacturing method in accordance with the first embodiment further comprises an operation in which the green tire is heated. The tire obtained by the method of the first embodiment may be a pneumatic tire.

A first variation on the first embodiment will now be described. Whereas the masterbatch manufacturing method in accordance with the first embodiment comprised an operation in which carbon black and rubber latex were mixed to obtain a carbon black slurry, a variation on the first embodiment comprises, instead of that operation, an operation in which carbon black and water are mixed to obtain a carbon black slurry.

A second variation on the first embodiment will now be described. Whereas dewatering, drying, and plasticization of the coagulum take place at extruder 5 in the masterbatch manufacturing method of the first embodiment, in a second variation on the first embodiment a dewatering extruder is used to dewater the coagulum by means of compaction and evaporation, and a drying/plasticizing extruder is used to cause the dewatered coagulum to be plasticized as it is dried. As such a dewatering extruder, it is, for example, possible to employ an extruder having a structure such as that of extruder 5 except that portion 523 of screw 52 and barrel 53 have been removed therefrom.

Working Examples

Working examples in accordance with the present disclosure are described below.

Raw materials and reagents are indicated below.

| | |
|---|---|
| Natural rubber latex (dry rubber content = 31.2%; Mw = 232,000) | Manufactured by Golden Hope |
| Coagulant | Formic acid (reagent-grade 85%) manufactured by Nacalai Tesque, Inc. (diluted to obtain 10% solution and pH adjusted to 1.2 prior to use) |
| Carbon black | "SEAST SO" (N550) manufactured by Tokai Carbon Co., Ltd. ($N_2SA$ 42 $m^2/g$) |
| Zinc oxide | "Zinc Oxide No. 3" manufactured by Mitsui Mining & Smelting Co., Ltd. |
| Stearic acid | "LUNAC S-20" manufactured by Kao Corporation |
| Wax | "OZOACE 0355" manufactured by Nippon Seiro Co., Ltd. |
| Antioxidant A | "6PPD" manufactured by Monsanto Company (N-phenyl-N'-(1,3-dimethylbutyl)-p-phenylenediamine; melting point 44° C.) |
| Antioxidant B | "RD" manufactured by Ouchi Shinko Chemical Industrial Co., Ltd. (2,2,4-trimethyl-1,2-dihydroquinoline polymer; melting point 80° C. to 100° C.) |
| Sulfur | "5% Oil Treated Sulfur Powder" manufactured by Tsurumi Chemical Industry Co., Ltd. |
| Vulcanization Accelerator A | "Sanceler CM" manufactured by Sanshin Chemical Industry Co., Ltd. (N-cyclohexyl-2-benzothiazolesulfenamide) |
| Vulcanization Accelerator B | "NOCCELER D" manufactured by Ouchi Shinko Chemical Industrial Co., Ltd. (1,3-diphenylguanidine) |

Preparation of Masterbatch at the Various Examples

Water was added at 25° C. to natural rubber latex manufactured by Golden Hope to prepare a dilute natural rubber latex having a solids (rubber) concentration that was 0.5 mass %, and a natural rubber latex having a solids (rubber) concentration that was 27 mass %. Carbon black was added to dilute natural rubber latex, and a ROBO MIX manufactured by PRIMIX Corporation was used to disperse the carbon black to obtain a carbon black slurry. The carbon black slurry was added to the natural rubber latex having the solids (rubber) concentration that was 27 mass % in accordance with TABLE 1, a mixer for household use manufactured by SANYO was used to agitate this at 11300 rpm for 30 min, and coagulant was added in an amount sufficient to achieve a pH of 4 to obtain a coagulum. A squeezer-type single-screw dewatering extruder (Model V-02 screw press manufactured by Suehiro EPM Corporation) having screw characteristics as shown in TABLE 1 was used to dewater the coagulum to obtain a masterbatch.

Measurement of Rubber Temperature

A contact-type thermometer was used to measure the temperature of the rubber that was discharged from the discharge port portion of the squeezer-type single-screw dewatering extruder.

Measurement of Water Content

Water content of masterbatch was measured in accordance with JIS K 6238-2 using an MX-50 heating-and-drying-type moisture analyzer manufactured by A&D Company, Limited.

Preparation of Vulcanized Rubber at the Various Examples

The compounding ingredients except for sulfur and vulcanization accelerator were added to the masterbatch in accordance with TABLE 1, a Model B Banbury mixer manufactured by Kobe Steel, Ltd., was used to carry out kneading, and the rubber mixture was discharged. The rubber mixture was then kneaded together with sulfur and vulcanization accelerator in a Model B Banbury mixer to obtain unvulcanized rubber. The unvulcanized rubber was vulcanized at 150° C. for 30 min to obtain vulcanized rubber.

Hardness

Hardness of the vulcanized rubber at 23° C. was measured using Type A durometer in accordance with JIS K 6253. Hardness of the respective Examples is shown as indexed relative to a value of 100 for the hardness obtained at Comparative Example 1. The higher the index the higher the hardness.

Tear Strength

A die for punching crescent-shaped cutouts for testing as specified at JIS K 6252 was used to punch cutouts from vulcanized rubber, a cut which was 0.50 mm±0.08 mm was made in the center of the concavity of each test piece, and a tensile test machine from Shimadzu Corporation was used to carry out tensile testing at a grip separation rate of 500 mm/min to determine tear strength. Tear strength of the respective Examples is shown as indexed relative to a value of 100 for the tear strength obtained at Comparative Example 1. The higher the index the more excellent the tear strength.

TABLE 1

|  |  |  | Comparative Example 1 | Working Example 1 | Working Example 2 | Working Example 3 | Working Example 4 | Working Example 5 | Working Example 6 | Working Example 7 |
|---|---|---|---|---|---|---|---|---|---|---|
| Preparation of masterbatch | Screw characteristics | R | 2.50 | 2.50 | 2.50 | 2.50 | 1.43 | 1.11 | 2.50 | 2.50 |
|  |  | r | 2.50 | 1.67 | 2.00 | 1.01 | 1.01 | 1.01 | 1.67 | 1.67 |
|  |  | $L_1/L_2$ | 1 | 1 | 1 | 1 | 1 | 1 | 1/3 | 3 |
|  |  | Screw heating temperature ° C. | 150 | 150 | 150 | 150 | 150 | 150 | 150 | 150 |
|  | Parts by mass | Natural rubber latex (solids content) | 100 | 100 | 100 | 100 | 100 | 100 | 100 | 100 |
|  |  | Carbon black | 50 | 50 | 50 | 50 | 50 | 50 | 50 | 50 |
|  | Rubber temperature ° C. |  | 189 | 130 | 129 | 137 | 125 | 132 | 125 | 135 |
|  | Masterbatch water content mass % |  | 3.2 | 0.5 | 0.6 | 0.4 | 0.5 | 0.6 | 0.5 | 0.4 |
| Preparation of unvulcanized rubber | Parts by mass | Masterbatch | 150 | 150 | 150 | 150 | 150 | 150 | 150 | 150 |
|  |  | Zinc oxide | 3 | 3 | 3 | 3 | 3 | 3 | 3 | 3 |
|  |  | Stearic acid | 2 | 2 | 2 | 2 | 2 | 2 | 2 | 2 |
|  |  | Wax | 2 | 2 | 2 | 2 | 2 | 2 | 2 | 2 |
|  |  | Antioxidant A | 2 | 2 | 2 | 2 | 2 | 2 | 2 | 2 |
|  |  | Antioxidant B | 1 | 1 | 1 | 1 | 1 | 1 | 1 | 1 |
|  |  | Sulfur | 2 | 2 | 2 | 2 | 2 | 2 | 2 | 2 |
|  |  | Vulcanization Accelerator A | 1.5 | 1.5 | 1.5 | 1.5 | 1.5 | 1.5 | 1.5 | 1.5 |
|  |  | Vulcanization Accelerator B | 0.5 | 0.5 | 0.5 | 0.5 | 0.5 | 0.5 | 0.5 | 0.5 |
| Evaluation of vulcanized rubber | Hardness |  | 100 | 110 | 109 | 110 | 108 | 111 | 109 | 109 |
|  | Tear strength |  | 100 | 109 | 108 | 111 | 110 | 110 | 110 | 109 |

As indicated at TABLE 1, use of an extruder having screw characteristics which were such that R>r to dewater a coagulum made it possible to efficiently reduce the water content of the coagulum, and made it possible to improve the hardness and/or tear strength of vulcanized rubber.

The invention claimed is:

1. An extruder for manufacturing masterbatch comprising:
   a barrel; and
   a screw provided with a helical groove;
   wherein the screw comprises a dewatering portion comprising a first portion, and a second portion at a location downstream from the first portion;
   wherein, at the dewatering portion, clearance between the groove and the barrel decreases as one proceeds downstream;
   wherein a reduction ratio R of the clearance at the first portion is greater than a reduction ratio r of the clearance at the second portion;
   wherein R is given by Formula I;
   wherein the Formula I is $R=H_N/H_{N+1}$;

$H_N$ indicates the clearance between the groove and the barrel at an arbitrary Nth turn of the groove in the first portion;
   $H_{N+1}$ indicates the clearance between the groove and the barrel at an N+1st turn of the groove in the first portion;
   wherein r is given by Formula II;
   wherein the Formula II is $r=h_n/h_{n+1}$;

wherein $h_n$ indicates the clearance between the groove and the barrel at an arbitrary nth turn of the groove in the second portion; and
   wherein $h_{n+1}$ indicates the clearance between the groove and the barrel at an n+1st turn of the groove.

2. A masterbatch manufacturing method comprising:
   an operation in which pre-coagulation rubber latex comprising filler is coagulated to obtain a coagulum; and
   an operation in which the extruder according to claim 1 is used to dewater the coagulum.

3. A tire manufacturing method comprising: an operation in which the masterbatch manufacturing method according to claim 2 is used to prepare a masterbatch;
   an operation in which at least the masterbatch and compounding ingredients are dry-mixed to obtain a mixture;
   an operation in which at least a vulcanizing compounding ingredient is kneaded into the mixture to obtain a rubber composition; and
   an operation in which a green tire equipped with a tire member made up of the rubber composition is made.

4. The tire manufacturing method according to claim 3 wherein the vulcanizing compounding ingredient comprises sulfur.

5. The masterbatch manufacturing method according to claim 2 wherein the operation in which the extruder is used to dewater the coagulum comprises increasing temperature of the coagulum to 110° C. to 160° C. at the first portion.

6. The masterbatch manufacturing method according to claim 2 wherein, during the operation in which the extruder is used to dewater the coagulum, temperature of the coagulum when in a space between the barrel and the second portion of the screw is not greater than 160° C.

7. The masterbatch manufacturing method according to claim 2 further comprising an operation in which a carbon black slurry and rubber latex are mixed to obtain the pre-coagulation rubber latex.

8. The masterbatch manufacturing method according to claim 7 wherein the rubber latex is natural rubber latex.

9. The masterbatch manufacturing method according to claim 2
   wherein the operation in which the extruder is used to dewater the coagulum comprises increasing temperature of the coagulum to 110° C. to 160° C. at the first portion; and
   wherein, during the operation in which the extruder is used to dewater the coagulum, temperature of the coagulum when in a space between the barrel and the second portion of the screw is not greater than 160° C.

10. The masterbatch manufacturing method according to claim 3, wherein the vulcanizing compounding ingredient is a vulcanizing accelerator selected from the group consisting of a sulfenamide vulcanization accelerator, a thiuram vulcanization accelerator, a thiazole vulcanization accelerator, a thiourea vulcanization accelerator, a guanidine vulcanization accelerator and a dithiocarbamate vulcanization accelerator.

11. The masterbatch manufacturing method according to claim 3, wherein the vulcanizing compounding ingredient is an organic peroxide.

* * * * *